United States Patent
Cho et al.

(10) Patent No.: US 11,577,618 B2
(45) Date of Patent: Feb. 14, 2023

(54) WIRED/WIRELESS INTEGRATED POWER RECEPTION SYSTEM

(71) Applicant: LG Electronics Inc., Seoul (KR)

(72) Inventors: Yongnam Cho, Seoul (KR); Byunghyuk Lee, Seoul (KR); Jongseok Baek, Seoul (KR); Bohwan Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/266,468

(22) PCT Filed: Aug. 6, 2019

(86) PCT No.: PCT/KR2019/009795
§ 371 (c)(1),
(2) Date: Feb. 5, 2021

(87) PCT Pub. No.: WO2020/032537
PCT Pub. Date: Feb. 13, 2020

(65) Prior Publication Data
US 2021/0300192 A1    Sep. 30, 2021

(30) Foreign Application Priority Data
Aug. 6, 2018 (KR) .................... 10-2018-0091349

(51) Int. Cl.
*B60L 53/12* (2019.01)
*B60L 50/60* (2019.01)
*B60L 53/14* (2019.01)

(52) U.S. Cl.
CPC ............... *B60L 53/12* (2019.02); *B60L 50/60* (2019.02); *B60L 53/14* (2019.02); *B60L 2210/30* (2013.01)

(58) Field of Classification Search
CPC .......... B60L 53/12; B60L 50/60; B60L 53/14; B60L 2210/30; B60L 53/20; B60L 58/10; B60L 53/66; Y02T 10/70; Y02T 10/7072; Y02T 90/12; Y02T 90/14; Y02T 90/16; B60Y 2200/91
USPC ........................................................ 320/108
See application file for complete search history.

(56) References Cited

U.S. PATENT DOCUMENTS

2017/0072807 A1* 3/2017 Matsumoto ............... H02J 7/02

* cited by examiner

*Primary Examiner* — Paul Dinh
(74) *Attorney, Agent, or Firm* — Fish & Richardson P.C.

(57) ABSTRACT

The present disclosure relates to a wired/wireless integrated power reception system provided in a vehicle, the wireless/wireless integrated power reception system including: a wired power reception apparatus configured to receive power from a transformer in a wired power receiving mode; a relay unit, which upon detecting reception of wireless power from a wireless power transmission pad, is configured to switch to a wireless power receiving mode; and a wireless power reception pad configured to receive power by magnetic coupling in the wireless power receiving mode.

12 Claims, 11 Drawing Sheets

[FIG. 1]
300
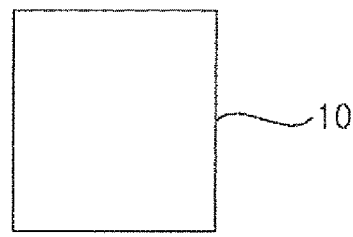
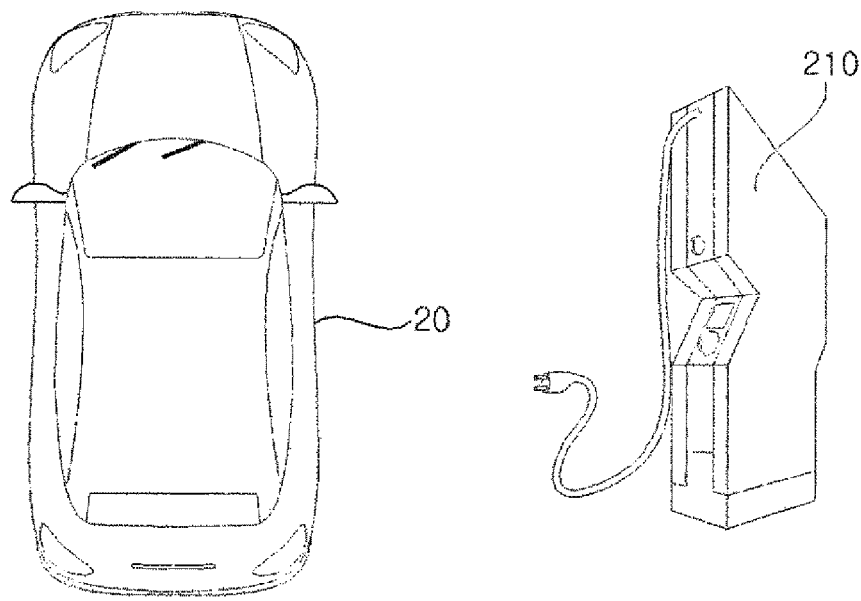

[FIG. 2A]
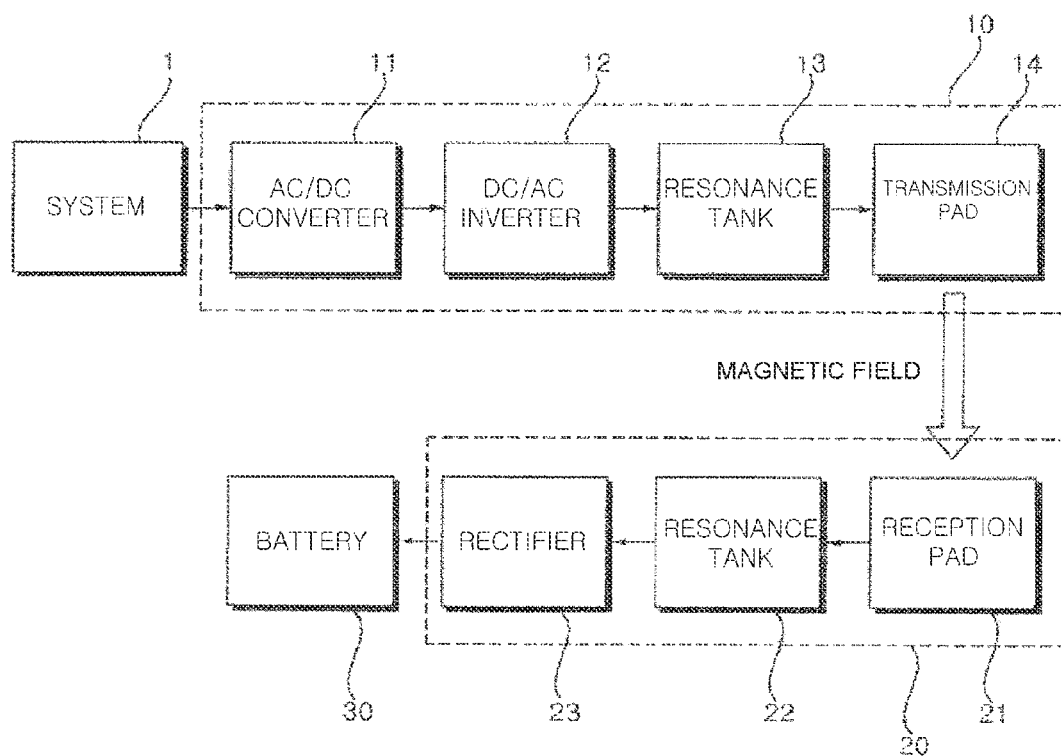

[FIG. 2B]
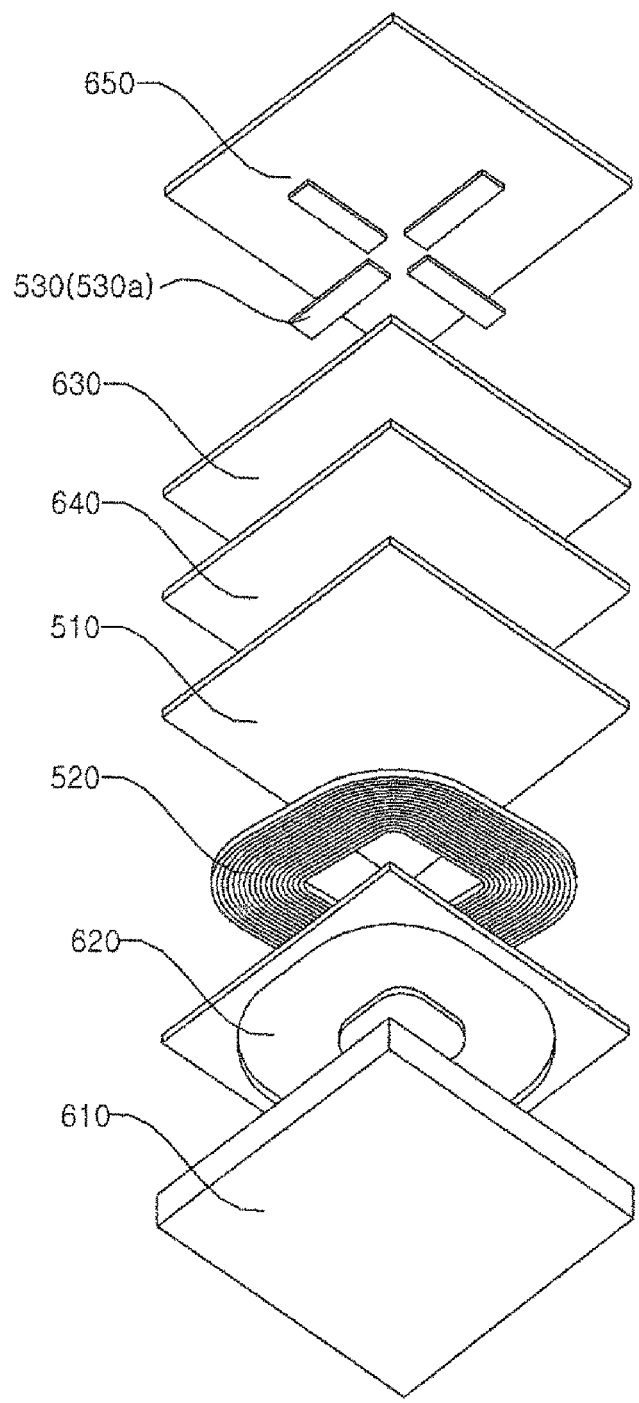

[FIG. 3]
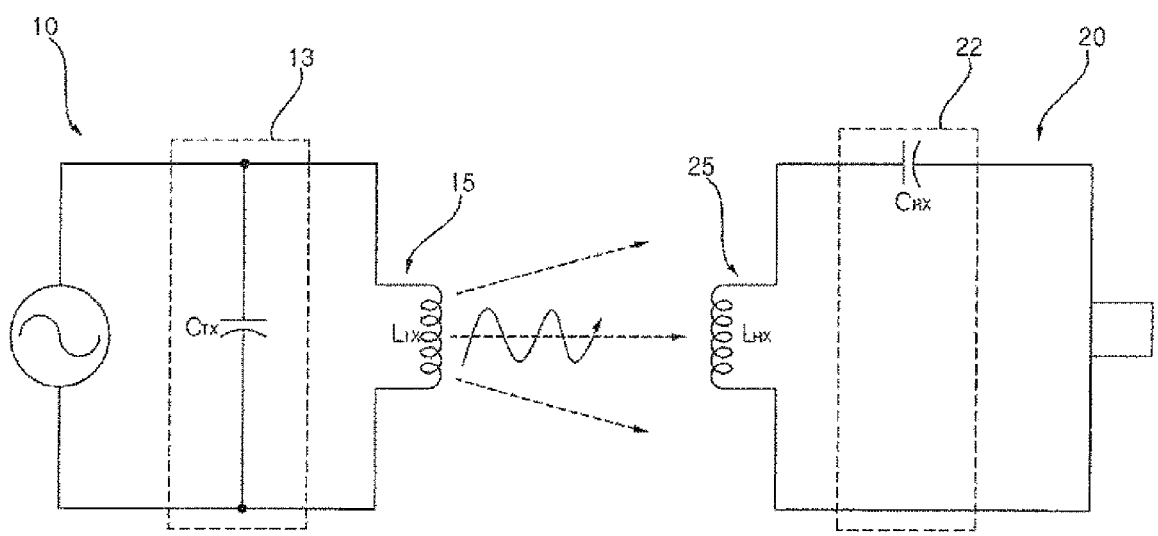

[FIG. 4]
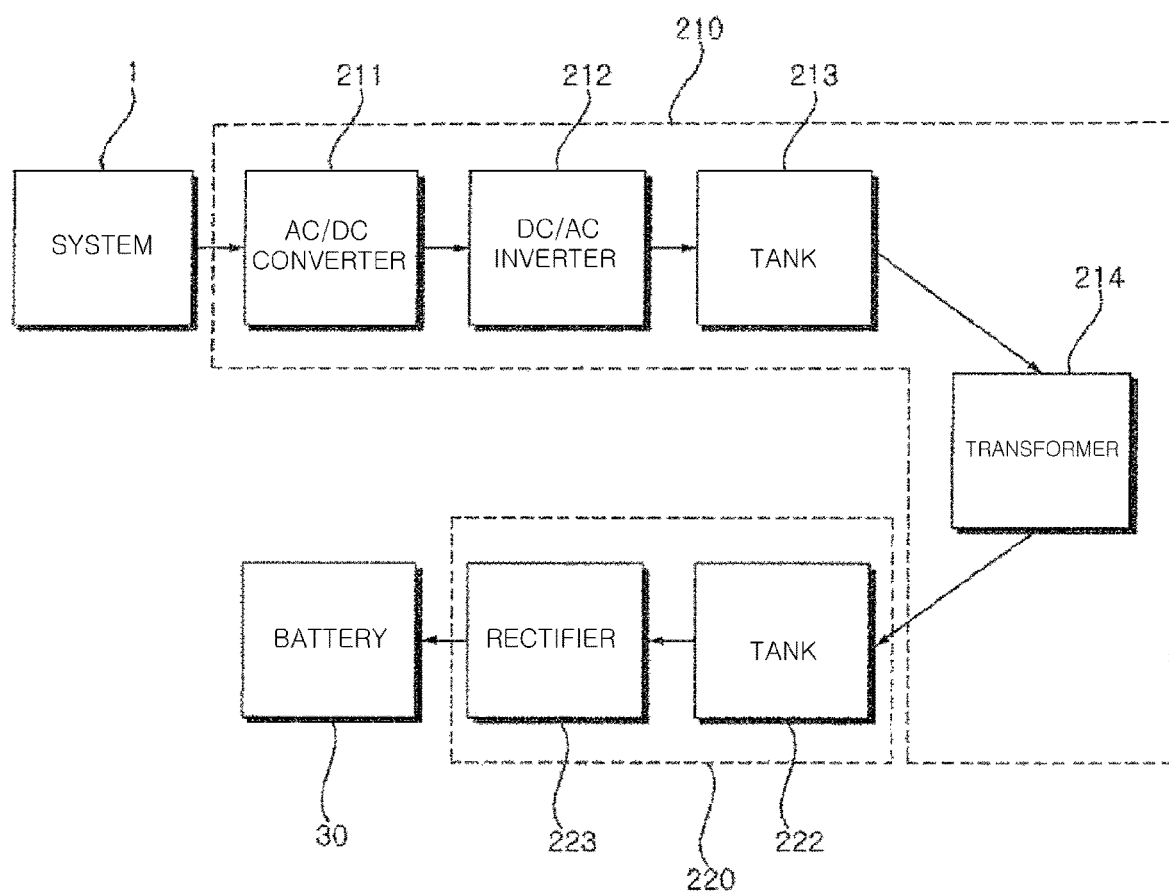

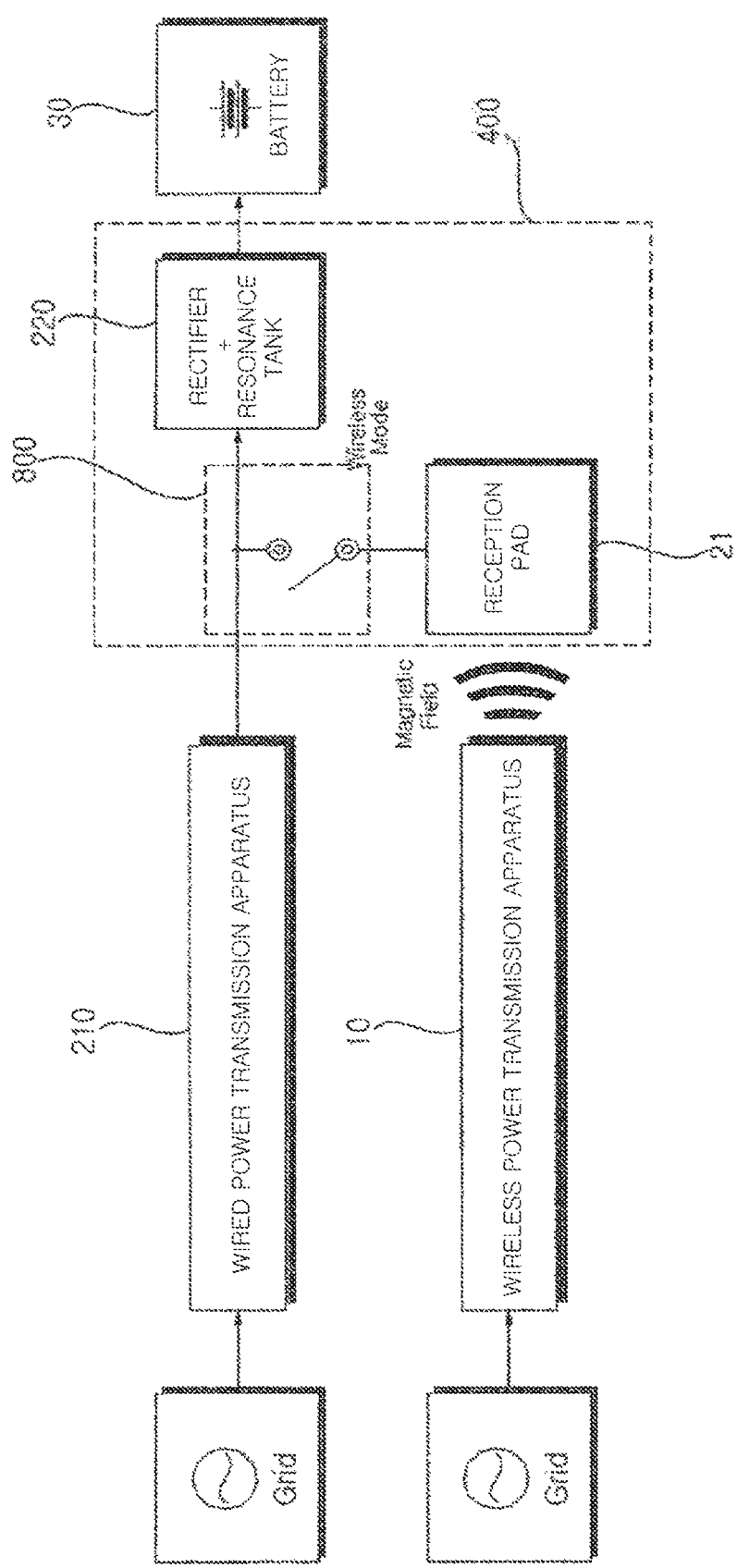
[FIG. 5]

[FIG. 6]
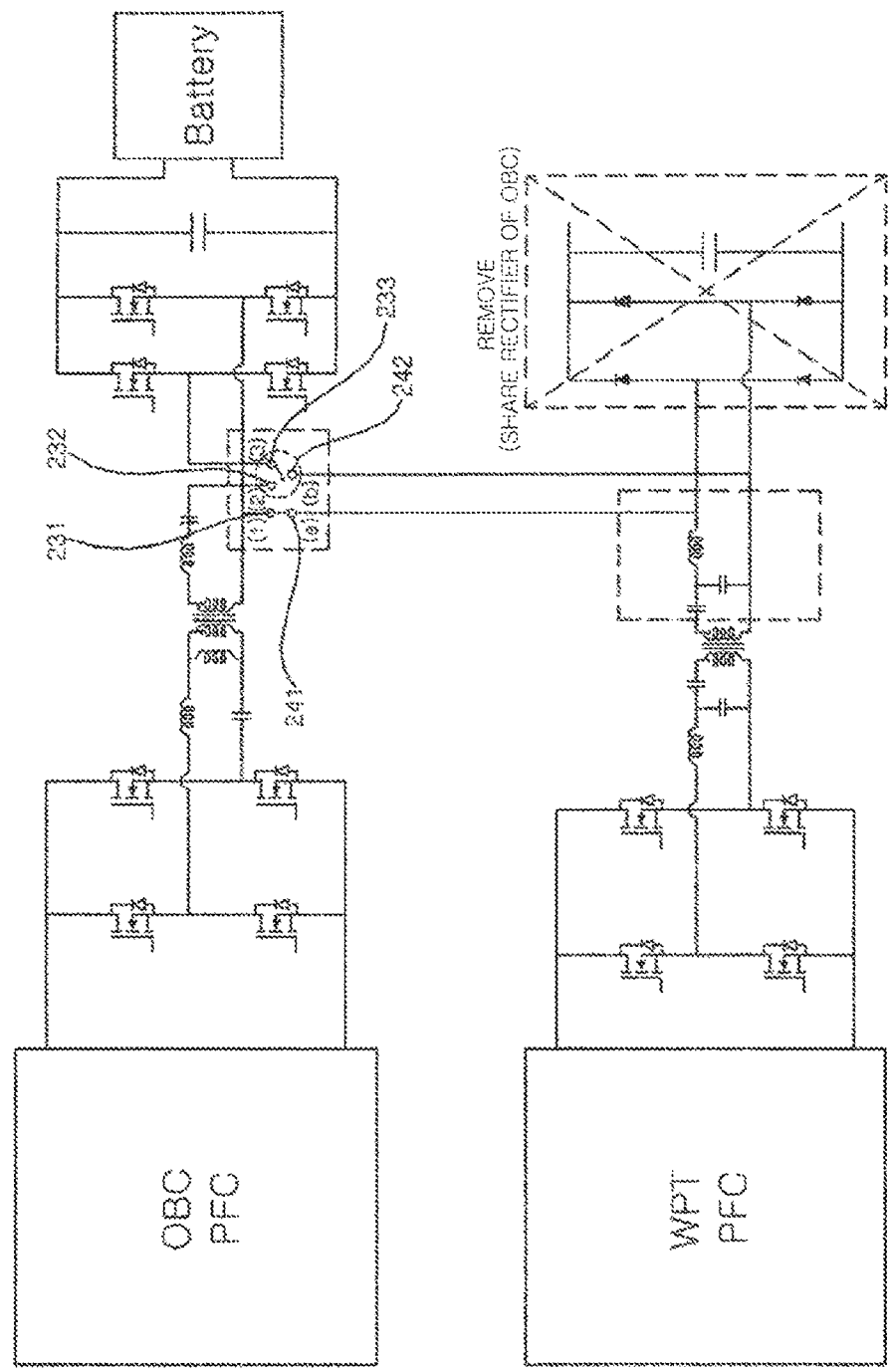

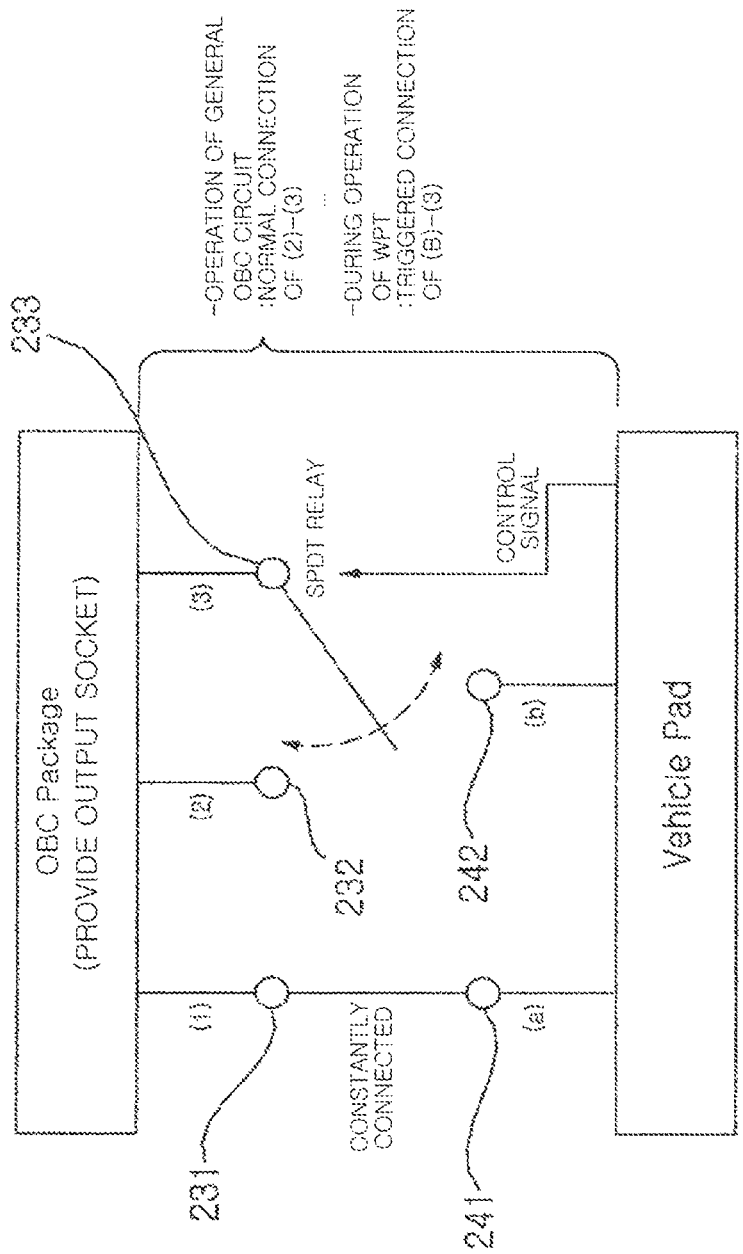
[FIG. 7]

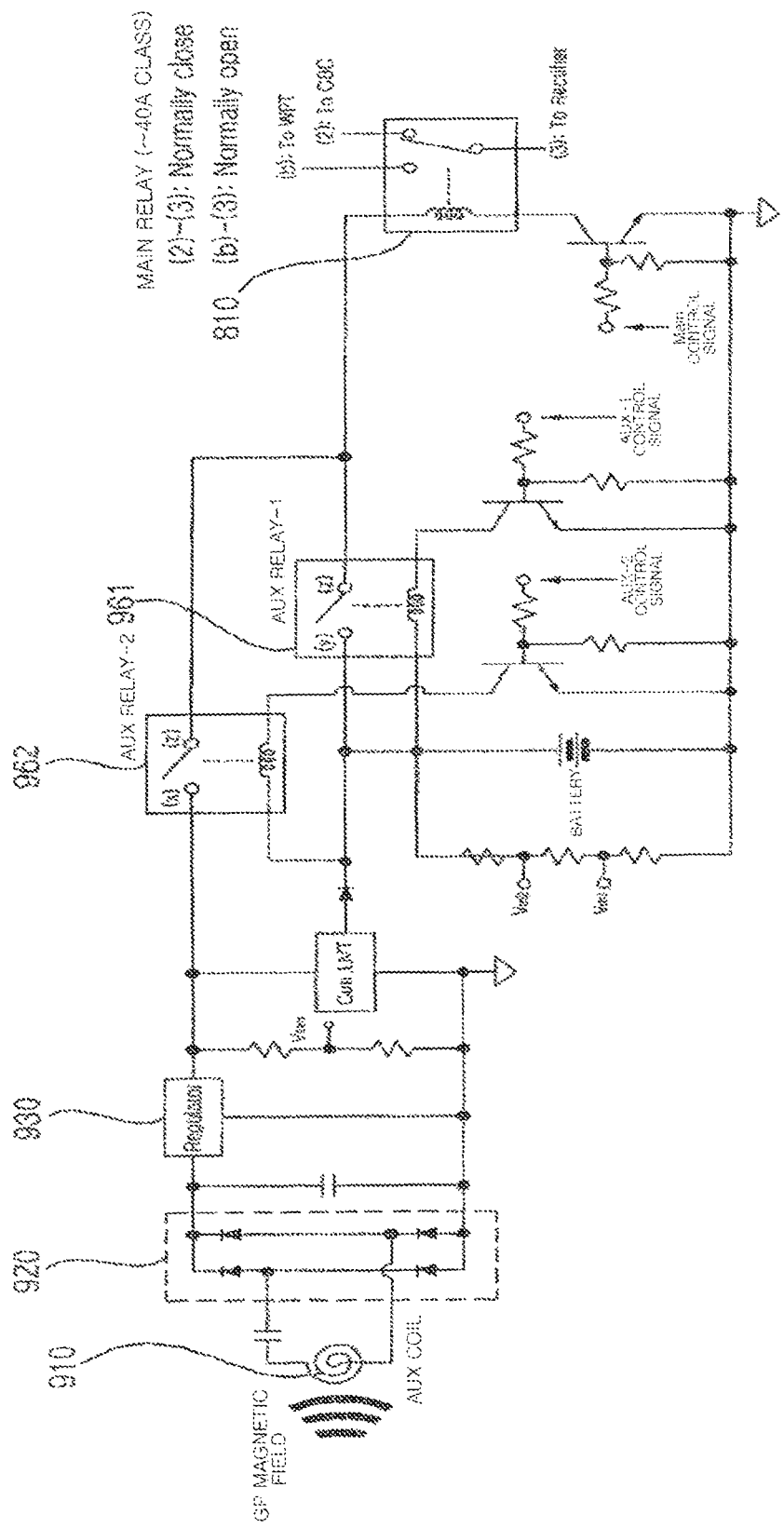
[FIG. 8]

[FIG. 9]
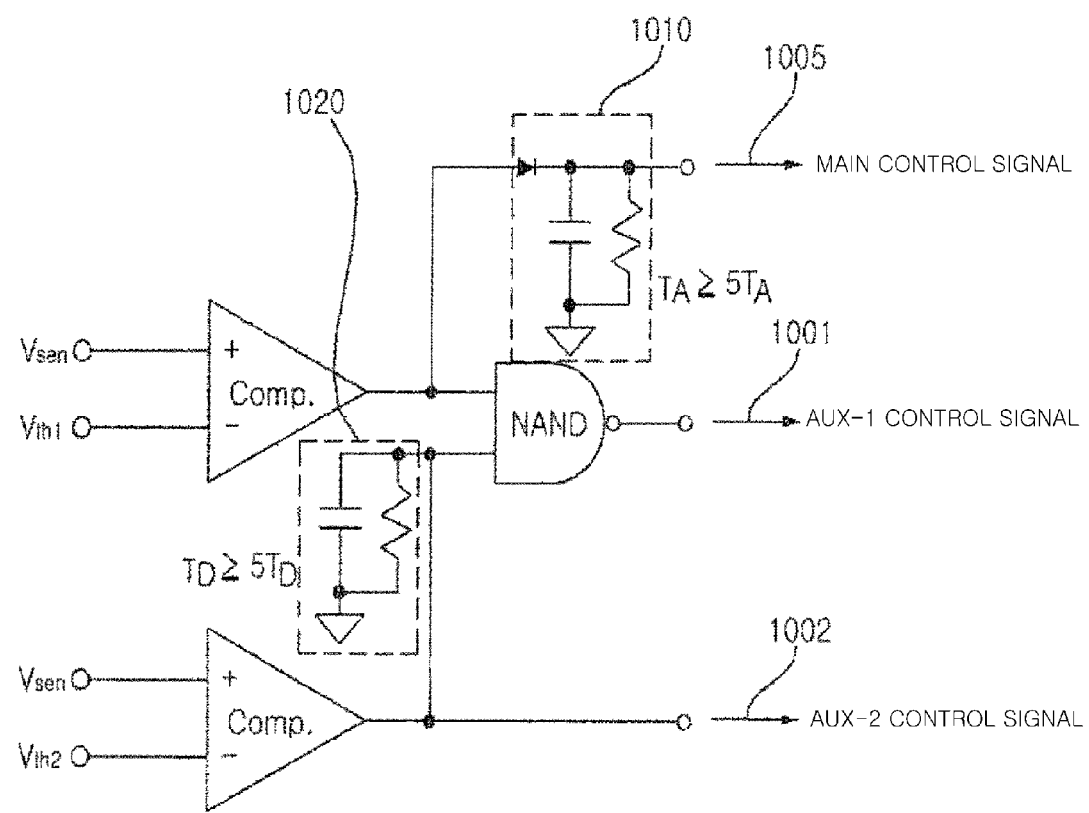

[FIG. 10]
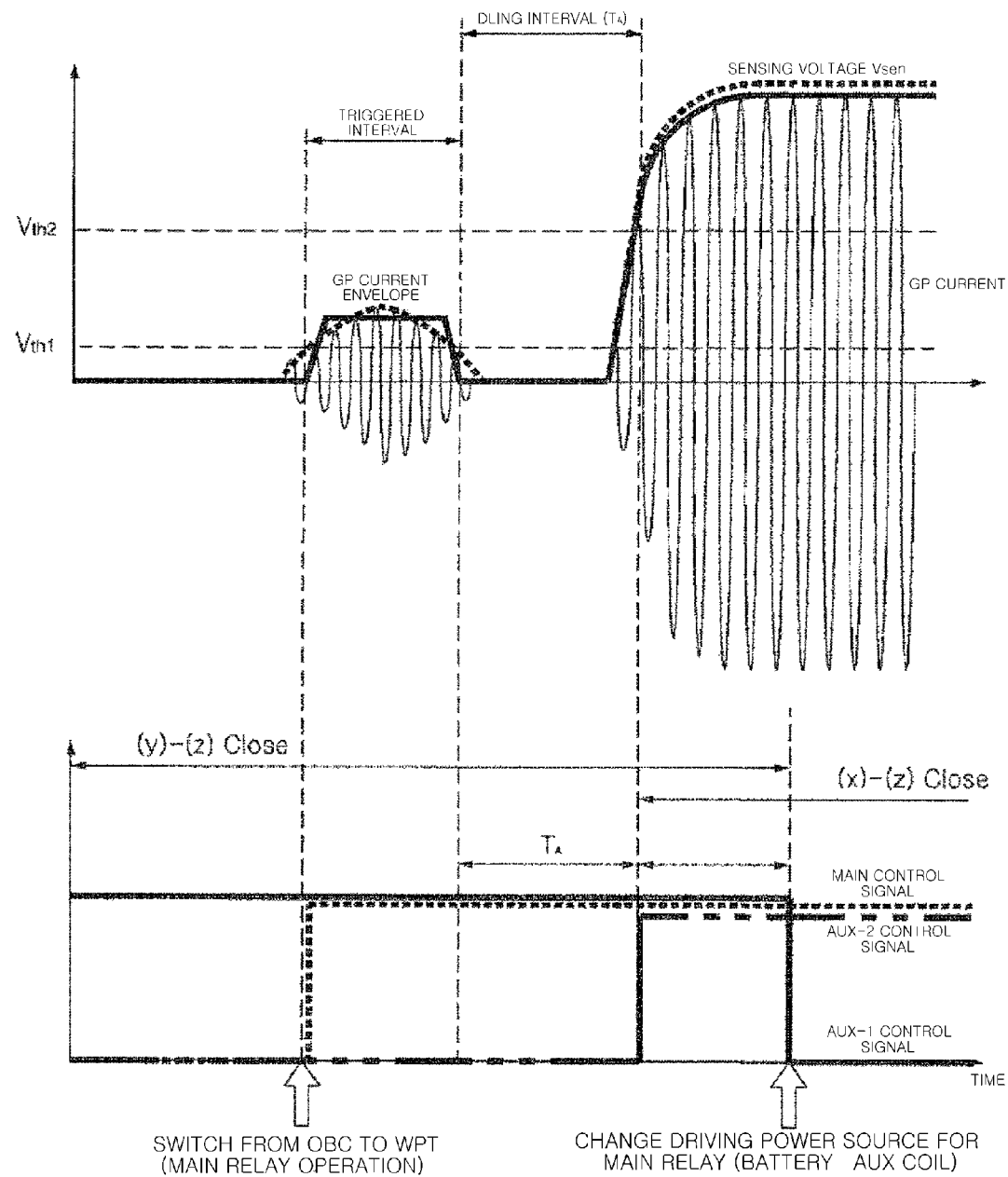

WIRED/WIRELESS INTEGRATED POWER RECEPTION SYSTEM

CROSS-REFERENCE TO RELATED APPLICATIONS

This application is a National Stage application under 35 U.S.C. § 371 of International Application No. PCT/KR2019/009795, filed on Aug. 6, 2019, which claims the benefit of Korean Patent Application No. 10-2018-0091349, filed on Aug. 6, 2018. The disclosures of the prior applications are incorporated by reference in their entirety.

TECHNICAL FIELD

The following description relates to a wired/wireless integrated power reception system.

BACKGROUND ART

In continued research on electronic devices, studies are also conducted on a wireless charging system for providing electric power to the electronic devices. Many companies are committed to research and development of the wireless charging system of electric cars.

A wired charging system of electric cars has been commercialized and widely used. It is predicted that such wired charging system will be gradually changed to a wireless charging system. In an environment where the wired charging system is used in combination with the wireless charging system, there is a need for a wired/wireless integrated power reception system which may be implemented at a minimum cost and may allow wired and wireless charging systems to perform operations without affecting each other.

U.S. Pat. No. 9,381,821 discloses a wired/wireless charging apparatus of an electric car. However, the wired/wireless charging apparatus has a problem in that mutual impedance occurs when the wired and wireless charging systems are combined at a high-frequency AC terminal. That is, there is a problem in that when the respective wired and wireless chargers operate, interference of operation may occur due to mutual impedance. For example, when a wired charger operates, an output control range of the wired charger is reduced due to impedance of a resonant tank and a wireless charging pad, thereby causing a reduction in efficiency.

DISCLOSURE OF INVENTION

Technical Problem

In order to solve the above problems, it is an object of the present disclosure to provide a wired/wireless integrated power reception system, which allows a wired charging system and a wireless charging system to perform operations without affecting each other, while making the best use of components of the wired charging system. The objects of the present disclosure are not limited to the aforementioned object, and other objects not described herein will be clearly understood by those skilled in the art from the following description.

Technical Solution

In accordance with an aspect of the present disclosure, the above and other objects can be accomplished by providing a wired/wireless integrated power reception system which includes a relay unit configured to switch between a wired power receiving mode and a wireless power receiving mode.

The wired/wireless integrated power reception system according to an embodiment of the present disclosure may include a wired power reception apparatus, and the wired power reception apparatus may include a rectifier.

According to an embodiment of the present disclosure, the relay unit may include a main relay configured to switch connection between a first port, a second port, and a third port, which are provided from the wired power reception apparatus, and port a and port b provided from a wireless power reception pad.

The wired/wireless integrated power reception system according to an embodiment of the present disclosure may include a driving circuit configured to supply driving power to the main relay, and the driving circuit may include a power supply unit and an auxiliary coil.

According to an embodiment of the present disclosure, the driving circuit may further include a first auxiliary relay, a rectifier, and a second auxiliary relay.

Other detailed matters of the exemplary embodiments are included in the detailed description and the drawings.

Advantageous Effects

The wired/wireless integrated power reception system according to the present disclosure has one or more of the following effects.

First, a wireless power transmission system may be combined with a general wired power transmission system, while minimizing a change in structure of the general wired power transmission system.

Second, a problem of impedance interference may be solved, which occurs due to the wireless power transmission system during the operation of the wired charging power transmission system.

The effects of the present disclosure are not limited to the aforesaid, and other effects not described herein will be clearly understood by those skilled in the art from the following description of the appended claims.

DESCRIPTION OF DRAWINGS

FIG. 1 is a diagram illustrating an exterior of a wired/wireless integrated charging system according to an embodiment of the present disclosure.

FIG. 2A is a block diagram illustrating a wireless charging system according to an embodiment of the present disclosure.

FIG. 2B is an exploded perspective view of a wireless power reception pad according to an embodiment of the present disclosure.

FIG. 3 is a diagram referred to in description of a wireless charging method according to an embodiment of the present disclosure.

FIG. 4 is a block diagram illustrating a wired charging system according to an embodiment of the present disclosure.

FIG. 5 is a diagram referred to in description of a wired/wireless integrated charging system according to an embodiment of the present disclosure.

FIGS. 6 to 10 are diagrams referred to in description of a wired/wireless integrated power reception system according to an embodiment of the present disclosure.

BEST MODE FOR CARRYING OUT THE INVENTION

Reference will now be made in detail to embodiments of the invention, examples of which are illustrated in the accompanying drawings. Wherever possible, the same reference numbers will be used throughout the drawings to refer to the same or like parts. In general, a suffix such as "module" and "unit" used to refer to elements or components in the following description is merely intended to facilitate description of the specification, and the suffix itself is not intended to give any special meaning or function. It will be noted that a detailed description of known arts will be omitted if it is determined that the detailed description of the known arts can obscure the embodiments of the invention. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that, although the terms first, second, etc., may be used herein to describe various elements, these elements should not be limited by these terms. These terms are only used to distinguish one element from another.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

As used herein, the singular forms are intended to include the plural forms as well, unless the context clearly indicates otherwise.

It should be understood that the terms "comprise", 'include", "have", etc. when used in this specification specify the presence of stated features, integers, steps, operations, elements, components, or combinations of them but do not preclude the presence or addition of one or more other features, integers, steps, operations, elements, components, or combinations thereof.

A vehicle as described in this specification may include a car and a motorcycle. The following description of the vehicle will be focused on a car.

A vehicle as described in this specification may include all of an internal combustion engine vehicle including an engine as a power source, a hybrid vehicle including both an engine and an electric motor as a power source, an electric vehicle including an electric motor as a power source, and the like.

In the following description, the left of a vehicle means the left of the vehicle in the direction of travel and the right of the vehicle means the right of the vehicle in the direction of travel.

FIG. 1 is a diagram illustrating an exterior of a wired/wireless integrated charging system according to an embodiment of the present disclosure.

Referring to FIG. 1, a wired/wireless integrated charging system 300 according to an embodiment of the present disclosure may include a wireless charging system 100 (see FIG. 2) and a wired charging system 200 (see FIG. 4). The wireless charging system 100 may include a wireless power transmission apparatus 10 and a wireless power reception apparatus 20. The wired charging system 200 may include a wired power transmission apparatus 210 and a wired power reception apparatus 220. The wireless power reception apparatus 20 and the wired power reception apparatus 220 may be provided in the vehicle. The vehicle 20 may be a vehicle, such as an electric vehicle (EV) or a hybrid vehicle, which uses electric energy as driving power of the vehicle.

The vehicle 20 may be equipped with a wired/wireless integrated power reception system 400 (see FIG. 5). The wired/wireless integrated power reception system 400 may include the wireless power reception apparatus 20, the wired power reception apparatus 220, and a relay unit 800 (see FIG. 5) for switching a power receiving mode.

FIG. 2A is a block diagram illustrating a wireless charging system according to an embodiment of the present disclosure.

Referring to FIG. 2A, the wireless charging system 100 may include the wireless power transmission apparatus 10 and the wireless power reception apparatus 20.

The wireless power transmission apparatus 10 may include an AC/DC converter 11, a DC/AC inverter 12, a resonance tank 13, and a transmission pad 14. The AC/DC converter 11 may convert electric energy in the form of an alternating current, supplied from a system 1, into electric energy in the form of a direct current. The DC/AC inverter 12 may convert electric energy in the form of a direct current into electric energy in the form of an alternating current. In this case, the DC/AC inverter 12 may generate a signal having a high frequency ranging from tens of kHz to hundreds of kHz. The resonance tank 13 compensates for the impedance to be suitable for wireless charging. The resonance tank 13 may be understood as a sub-component of the transmission pad 14. The transmission pad 14 transmits electric power wirelessly. The transmission pad 14 includes a transmission coil 15 provided therein.

In a wireless power receiving mode, the wireless power reception apparatus 20 may receive power by magnetic coupling. The wireless power reception apparatus 20 may include a reception pad 21, a resonance tank 22, and a rectifier 23. The reception pad 21 receives electric power wirelessly. The reception pad 21 includes a reception coil 25 provided therein. The transmission pad 14 and the reception pad 21 may include a coil set (the transmission coil 15 and the reception coil 25) having magnetic coupling. The transmission pad 14 and the reception pad 21 may transmit electric power via a magnetic field, generated by a high-frequency driving signal, without physical contact (electrical contact) between electrodes. The resonance tank 22 compensates for the impedance to be suitable for wireless charging. The resonance tank 22 may be understood as a sub-component of the reception pad 21. In order to supply electric energy in the form of a direct current to a battery 30, the rectifier 23 may convert electric energy in the form of an alternating current into electric energy in the form of a direct current. The battery 30 may be provided in the vehicle to provide power for driving the vehicle.

Referring to FIG. 2B, the wireless power reception pad 21 may include a first case 610, a coil guide 620, at least one coil 520, at least one ferrite plate 510, an aluminum plate 630, an insulation sheet 640, a resonance tank 530, and a second case 650.

The first case 610 may form an exterior of the wireless power reception pad 21 along with the second case 650. The first case 610 may be coupled to the second case 650 to form an internal space, in which the coil guide 620, the coil 520, the ferrite plate 510, the aluminum plate 630, the insulation sheet 640, and the resonance tank 530 may be accommodated.

The coil guide 620 may be disposed above or below the coil 520. When coupled to the coil 520, the coil guide 620 may confine the coil 520 so that the coil 520 may be fixed and may not move. The coil 520 has a spiral shape, such that the overall shape of the coil 520 may be a circular shape, an elliptical shape, or a polygonal shape. The coil guide 620 may have a shape to accommodate a circular, elliptical, or polygonal coil. Depending on embodiments, the coil guide 620 may be integrally formed with the first case 610. Depending on embodiments, the coil guide 620 may be omitted.

The coil 520 may be a coil for receiving power. The coil 520 may be disposed above or below the ferrite plate 510. The coil 520 may be understood as the reception coil 25. The coil 520 may have a spiral shape. As the coil 520 is wound, the overall shape of the coil 520 may be a circular shape, an elliptical shape, or a polygonal shape. The coil 520 may have a first end 521 and a second end 529. The first end 521 may function as an input terminal or an output terminal of the wireless power reception pad 21. The second end 521 may be connected via a first wire 611 to at least one flat-type capacitor 530a of the resonance tank 530. The coil 520 may be disposed between the coil guide 620 and the ferrite plate 510.

The ferrite plate 510 may have a circular, elliptical, or polygonal plate shape. Depending on embodiments, a plurality of ferrite plates 510 may be provided. The ferrite plate 510 may be disposed between the coil 520 and the resonance tank 530. Depending on embodiments, the aluminum plate 630 and the insulation sheet 640 may be disposed between the ferrite plate 510 and the resonance tank 530.

The aluminum plate 630 may shield a magnetic field. The aluminum plate 630 may shield a magnetic field, generated during power reception, from leaking to the outside. The aluminum plate 630 may have a heat dissipation function. The aluminum plate 630 may guide heat, generated in the coil 520 and/or the ferrite plate 510 during power reception, to the outside of the wireless power reception pad 21. The aluminum plate 630 may be disposed between the ferrite plate 510 and the second case 650.

The insulation sheet 640 may shield an unintended current. For example, the insulation sheet 640 may shield a surface current flowing through the ferrite plate 510. For example, the insulation sheet 640 may shield a current so that the current does not flow from the capacitor of the resonance tank 530 to other components of the wireless power reception pad 21. The insulation sheet 640 may be disposed between the ferrite plate 510 and the second case 650. For example, the insulation sheet 640 may be disposed between the aluminum plate 630 and the flap type capacitor 530a.

The resonance tank 530 may be referred to as a tank circuit, a resonance circuit, a resonance tank circuit, and the like. The resonance tank 530 may be provided to compensate for the impedance of the coil 520. The resonance tank 530 may include at least one flat-type capacitor 530a. The resonance tank 530 according to a related art is designed to be included in a circuit unit, separately from the transmission pad 14 or the reception pad 21. In this case, when coupled to other manufacturer's product, a case and a heat dissipating structure should be changed in order to adjust a parameter of a resonator included in the circuit unit.

The wireless power reception pad 21 according to the present disclosure includes the resonance tank 530 provided therein, such that even when coupled to other manufacturer's product, only the flat-type capacitor is required to be changed without changing the circuit unit. That is, the wireless power reception pad 21 is advantageous in that the parameter of the resonator may be easily adjusted. In addition, the parameter of the resonator may be adjusted without changing the exterior by changing a molding of the wireless power reception pad 21 and the like, or without changing a cooling structure.

By using the flat-type capacitor, the wireless power reception pad 21 according to the present disclosure may have a flat outer shape. The flat outer shape is advantageous in that the wireless power reception pad 21 may be easily mounted on the ground (transmission pad) or may be easily mounted in the vehicle (reception pad).

The flat-type capacitor 530a may be disposed above or below the ferrite plate 510. In this structure, the wireless power reception pad 21 having a flat shape and a small volume may be provided. A plurality of flat-type capacitors 530a may be provided. The flat-type capacitor 530a may include a first capacitor and a second capacitor.

The first capacitor may be connected in series with the coil 520 via the first wire. The second capacitor may be connected in series with the first capacitor. Depending on embodiments, the second capacitor may be connected in parallel with the first capacitor. The second capacitor may be connected to the rectifier 223 via a second wire. At least one capacitor may be connected in series between the first capacitor and the second capacitor. The capacitance may be adjusted according to the number of capacitors connected in series between the first capacitor and the second capacitor. The capacitance may be adjusted by serial or parallel connection of the plurality of capacitors including the first capacitor and the second capacitor.

The resonance tank 530 may be disposed between the ferrite plate 510 and the second case 650. Depending on embodiments, the aluminum plate 630, the insulation sheet 640, and the resonance tank 530 may be disposed between the second case 650 and the ferrite plate 510 in a different order from FIG. 5.

The second case 650 may form an exterior of the wireless power reception pad 21 along with the first case 610. The second case 650 may be coupled to the first case 610 to form an internal space.

FIG. 3 is a diagram referred to in description of a wireless charging method according to an embodiment of the present disclosure.

Referring to FIG. 3, a wireless charging system may use an inductive coupling method or a resonance coupling method.

According to the inductive coupling method, among two neighboring coils, when an intensity level of current flowing through a first coil is changed, a magnetic field is changed due to the changed current intensity. Accordingly, a magnetic flux flowing through a second coil is also changed, thereby generating an induced electromotive force in the second coil. That is, according to this method, the induced electromotive force may be generated by placing the two coils to be adjacent to one another without having to spatially move the two lines and by then changing the electric current of the first coil. In this case, the frequency characteristic is not significantly influenced. Nevertheless, depending on alignment and distance between a transmission device (e.g., wireless power transmission device) and a reception device (e.g., mobile terminal) which include the respective coils, power efficiency may be affected.

According to the resonance coupling method, among the changed amount of magnetic field, which is generated when a Resonance Frequency is applied to a first one of two coils being spaced apart from each other by a predetermined distance, a portion of the changed amount of magnetic field is applied to a second coil of the same Resonance Frequency, thereby generating an induced electromotive force from the second coil. That is, according to this method, when the transmitting and receiving devices respectively resonate at the same frequency, electromagnetic waves are delivered through a near field. Therefore, energy cannot be delivered if the frequency is different. In this case, it may be important to select a frequency. Since no energy is delivered between resonance frequencies spaced apart from each other by a predetermined spacing or more, a device to be charged may be selected by selecting a resonance frequency. In the case where only one device is allocated to a resonance frequency, selecting a resonance frequency may be considered as selecting a device to be charged.

The resonance coupling method has an effect in that compared to the inductive coupling method, power efficiency is relatively less affected by the alignment and distance between the transmission and reception devices which include the respective coils.

FIG. 4 is a block diagram illustrating a wired charging system according to an embodiment of the present disclosure.

Referring to FIG. 4, the wired charging system 200 may include the wired power transmission apparatus 210 and the wired power reception apparatus 220.

The wired power transmission apparatus 210 may include an AC/DC converter 211, a DC/AC inverter 212, and a resonance tank 213, as in the case of the general wireless power transmission apparatus 10, although the wired power transmission apparatus 210 may vary according to whether Zero Voltage Switching is performed or not. Depending on embodiments, a system 1 may be further included as a component in the wired power transmission apparatus 210. The wired power reception apparatus 220 may include a resonance tank 222 and a rectifier 223 as in the case of the wireless power reception apparatus 20. Depending on embodiments, the battery 30 may be further included as a component in the wired power reception apparatus 220.

The wired power transmission apparatus 210 may include the AC/DC converter 211, the DC/AC inverter 212, the resonance tank 213, and a transformer 214. The AC/DC converter 211 may convert electric energy in the form of an alternating current, supplied from a system 1, into electric energy in the form of a direct current. The DC/AC inverter 212 may convert electric energy in the form of a direct current into electric energy in the form of an alternating current. The resonance tank 213 may compensate for the impedance to be suitable for charging. The transformer 214 may supply alternating current power to the wired power reception apparatus 220 by electromagnetic induction through an iron core.

In the wired power reception mode, the wired power reception apparatus 220 may receive power from the transformer 214. The wired power reception apparatus 200 may include a resonance tank 222 and a rectifier 223. The resonance tank 222 compensates for the impedance. In order to supply electric energy in the form of a direct current to the battery 30, the rectifier 223 may convert electric energy in the form of an alternating current into electric energy in the form of a direct current.

When a wired/wireless integrated power reception system 400 is configured, there is a difficulty in design due to a difference in characteristics (e.g., impedance characteristics) between the transformer 214 of the wired power reception apparatus 220 and the reception pad 21 of the wireless power reception apparatus 20. In order to solve the problem, the wired/wireless integrated power reception system 400 according to an embodiment of the present disclosure includes a relay unit 800 (see FIG. 5).

FIG. 5 is a diagram referred to in description of a wired/wireless integrated charging system according to an embodiment of the present disclosure.

Referring to FIG. 5, the wired/wireless integrated power reception system 400 includes the wired power reception apparatus 220, the relay unit 800, and the wireless power reception pad 21.

In the wired power receiving mode, the wired power reception apparatus 220 may receive power from the transformer 214 (see FIG. 4). The wired power reception apparatus 200 may include the resonance tank 222 and the rectifier 223. In the wired power receiving mode, the rectifier 223 may convert AC power, supplied from the transformer 214, into DC power. In the wireless power receiving mode, the rectifier 223 may convert AC power, supplied by magnetic coupling, into DC power.

Upon detecting reception of wireless power from the wireless power transmission pad 14, the relay unit 800 may switch to the wireless power receiving mode. The relay unit 800 will be described below in further detail with reference to FIGS. 6 to 10.

In the wireless power receiving mode, the wireless power reception pad 21 may receive power by magnetic coupling. The description of FIG. 2B may also apply to the wireless power reception pad 21.

Further, depending on embodiments, the relay unit 800 may be classified as a sub-component of the wireless power reception pad 21. The relay unit 800 may be disposed in a space formed by coupling of the first case 610 and the second case 650.

In the wired/wireless integrated power reception system 400, wired and wireless chargers may share the rectifier in order to minimize an unnecessary controller and a semiconductor switch. To this end, the wireless power reception pad 21 is connected to a high-frequency alternating current terminal of the wired charging system 200. When wireless charging is in an inactive state, the wired/wireless integrated power reception system 400 is required to guarantee the operation of the wired charging system; and when wireless charging is in an active state, the operation of the wireless charging should not be interrupted by the wired charging system.

FIGS. 6 to 10 are diagrams referred to in description of a wired/wireless integrated power reception system according to an embodiment of the present disclosure.

FIGS. 6 and 7 are diagrams referred to in description of an operation of a relay unit according to an embodiment of the present disclosure.

FIG. 6 illustrates a wired/wireless integrated power system 400 using a single-pole double-throw (SPDT) relay. As illustrated in FIG. 7, the relay unit provides three output ports 231, 232, and 233 from an on-board charger (OBC) package and provides two output ports 241 and 242 from a wireless charging reception pad. As illustrated in FIG. 7, a rectifier input 233 is connected to the OBC or to a wireless power transfer (WPT) by the SPDT relay operation. During the operation of the OBC, the wireless power transfer (WPT) system may have an open circuit, and during the operation of the WPT, the OBC may have an open circuit, such that the WPT and the OBC do not affect each other's operation.

Referring to FIGS. 6 and 7, the wired power reception apparatus 200 may provide the first port 231, the second port 232, and the third port 233. The wireless power reception pad 21 may provide port a 241 and port b 242. The first port 231 and port a 241 may be constantly maintained in a connected state.

The relay unit 800 may include a main relay 810 (see FIG. 8) for switching connection between the second port 232 and the third port 233 and connection between the third port 233 and port b 242, while the first port 231 and port a 241 are constantly maintained in a connected state.

Generally, the second port 232 and the third port 233 are connected while the first port 231 and port a 241 are connected. When a trigger signal is applied as the vehicle 20 approaches the wireless power transmission apparatus 10, the main relay 810 may disconnect the connection between the second port 232 and the third port 233 and may perform switching so that the third port 233 and port b 242 may be connected. In this case, the trigger signal may be generated by magnetic coupling between the auxiliary coil 910 and the transmission coil 15.

When the second port 232 and the third port 233 are connected while the first port 231 and port a 241 are connected, power may be received from the transformer 214. In this case, a mode of the wired/wireless integrated power reception system 400 is a wired power receiving mode. When the third port 233 and port b 242 are connected while the first port 231 and port a 241 are connected, power may be received by magnetic coupling. In this case, a mode of the wired/wireless integrated power reception system 400 is a wireless power receiving mode.

FIGS. 8 to 10 are diagrams referred to in description of a main relay and a driving circuit.

The wired/wireless integrated power reception system 400 may further include a driving circuit 900 for supplying driving power to a main relay 810.

Referring to FIG. 8, the driving circuit 900 may include a power supply unit 950, an auxiliary coil 910, a rectifier 920, a regulator 930, a first auxiliary relay 961, and a second auxiliary relay 962.

In the wired power receiving mode, the power supply unit 950 may supply driving power for a switching operation by receiving power from the battery in the vehicle 20. The power supply unit 950 may provide low-voltage DC power as the driving power.

In the wireless power receiving mode, the auxiliary coil 910 may supply driving power for the switching operation. When the vehicle 20 approaches the wireless power transmission apparatus 10, the auxiliary coil 910 is magnetic coupled to the transmission coil 15, such that power may be received wirelessly. A trigger signal may be generated based on wireless power received by the auxiliary coil 910. The driving power for the switching operation of the main relay may be provided based on the wireless power received by the auxiliary coil 910.

The rectifier 920 may convert AC power, received by the auxiliary coil 910, into DC power by the magnetic coupling. The first auxiliary relay 961 may control the connection between the power supply unit 950 and the main relay 810. The second auxiliary relay 962 may control the connection between the rectifier 920 and the main relay 810.

The main relay 810, the first auxiliary relay 961, and the second auxiliary relay 962 may receive control signals according to a logic circuit illustrated in FIG. 9.

Referring to FIGS. 9 and 10, when the vehicle 20 does not approach the wireless power transmission pad 14, a first auxiliary control signal 1001 is applied, such that the first auxiliary relay 961 may be maintained in an ON state.

When the vehicle 20 approaches the wireless power transmission pad 14, and an output voltage value Vsen of the rectifier 920 is greater than a first threshold value Vth1, a main control signal 1005 is applied such that while the second port 232 and the third port 233 are connected, the main relay 810 may disconnect connection between the second port 232 and the third port 233 and may perform switching so that the third port 233 and port b 242 may be connected. In this case, the main control signal 1005 is generated through a delay block 1010, such that when a predetermined period of time elapses after a time when the output voltage value Vsec is greater than the first threshold value Vth1, and while the second port 232 and the third port 233 are connected, the main relay 810 may disconnect the connection between the second port 232 and the third port 233 and may perform switching to connect the third port 233 and port b 242. If the output voltage value Vsen of the rectifier 920 is greater than the first threshold value Vth1, power may be transmitted wirelessly, such that it may be understood that a trigger signal is generated in this case.

When the transmission pad 14 and the reception pad 21 are aligned, the transmission coil 15 and the auxiliary coil 910 are also aligned, such that if the output voltage value Vsen of the rectifier 920 is greater than a second threshold value Vth2, a second auxiliary control signal 1002 is applied, thereby allowing the second auxiliary relay 962 to be switched from an OFF state to an ON state. Thereafter, when a predetermined period of time elapses after the second auxiliary relay 962 is switched to an ON state, the first auxiliary relay 961 may be switched from an OFF state to an ON state by the delay block 1020.

When the first auxiliary relay 961 is in an OFF state and the second auxiliary relay 962 is in an ON state, a driving power source for the main relay 810 is switched from the power supply unit 950 to the auxiliary coil 910.

In addition, depending on embodiments, the driving circuit 900 may be classified as a sub-component of the wireless power reception pad 21. The driving circuit 900 may be disposed in a space formed by coupling of the first case 610 and the second case 650.

The scope of the invention should be determined by the appended claims and their legal equivalents, and all changes coming within the meaning and equivalency range of the appended claims are intended to be embraced therein.

The invention claimed is:

1. A wired/wireless integrated power reception system provided in a vehicle, the wired/wireless integrated power reception system comprising:
    a wired power reception apparatus configured to receive power from a transformer in a wired power receiving mode;
    a wireless power reception pad configured to receive power by magnetic coupling with a wireless power transmission apparatus in a wireless power receiving mode;
    a relay unit comprising a main relay configured to be connected to one of the wired power reception apparatus or the wireless power reception pad; and
    a driving circuit configured to supply, to the main relay, driving power for a switching operation,
    wherein the driving circuit comprises:
        a power supply unit configured to receive power from a battery of the vehicle and to supply the driving power to the main relay in the wired power receiving mode, and
        an auxiliary coil configured to receive power by magnetic coupling with the wireless power transmission apparatus and to supply the driving power to the main relay in the wireless power receiving mode.

2. The wired/wireless integrated power reception system of claim 1, wherein the wired power reception apparatus comprises a rectifier configured to convert alternating current (AC) power supplied from the transformer into direct current (DC) power in the wired power receiving mode, wherein the rectifier converts AC power, supplied by the magnetic coupling, into DC power in the wireless power receiving mode.

3. The wired/wireless integrated power reception system of claim 1, wherein:
the wired power reception apparatus provides a first port, a second port, and a third port;
the wireless power reception pad provides port a and port b; and
the main relay, while the first port and port A are connected, is configured to switch connection between the second port and the third port and connection between the third port and port b.

4. The wired/wireless integrated power reception system of claim 3, wherein the driving circuit comprises:
a first auxiliary relay configured to control connection between the power supply unit and the main relay;
a rectifier configured to convert AC power, received by the auxiliary coil through magnetic coupling, into DC power; and
a second auxiliary relay configured to control connection between the rectifier and the main relay.

5. The wired/wireless integrated power reception system of claim 4, wherein while the second port and the third port are connected, in response to an output voltage value of the rectifier being greater than a first threshold value, the main relay disconnects connection between the second port and the third port, and performs switching so that the third port and the port b are connected.

6. The wired/wireless integrated power reception system of claim 5, wherein, in response to an output voltage value of the rectifier being greater than a second threshold value, the second auxiliary relay is switched from OFF to ON.

7. The wired/wireless integrated power reception system of claim 6, wherein, based on a predetermined period of time being elapsed after the second auxiliary relay is switched to ON, the first auxiliary relay is switched from ON to OFF.

8. The wired/wireless integrated power reception system of claim 7, wherein, based on the first auxiliary relay being in an OFF state and the second auxiliary relay being in an ON state, a driving power source for the main relay is switched from the power supply unit to the auxiliary coil.

9. The wired/wireless integrated power reception system of claim 1, wherein, based on the vehicle approaching the wireless power transmission apparatus, the auxiliary coil is magnetic coupled to a transmission coil included in the wireless power transmission apparatus.

10. The wired/wireless integrated power reception system of claim 1, wherein the wireless power reception pad comprises a rectifier configured to convert electric energy in the form of an alternating current into electric energy in the form of a direct current,
wherein the wired power reception apparatus shares the rectifier with the wireless power reception pad.

11. The wired/wireless integrated power reception system of claim 1, wherein the wireless power reception pad comprises:
a coil for receiving power; and
a resonance tank configured to compensate for impedance of the coil,
wherein the resonance tank includes a flat-type capacitor.

12. The wired/wireless integrated power reception system of claim 11, wherein the wireless power reception pad further comprises:
a ferrite plate disposed between the coil and the resonance tank; and
an aluminum plate disposed between the ferrite plate and the resonance tank.

* * * * *